United States Patent [19]
Taguchi et al.

[11] 3,889,281
[45] June 10, 1975

[54] CAMERA INCORPORATING DATA RECORDING DEVICE

[75] Inventors: Tetsuya Taguchi, Kawasaki; Mutsunobu Yazaki; Mutsuhide Matsuda, both of Yokohama, all of Japan

[73] Assignee: Canon Kabushiki Kaisha, Tokyo, Japan

[22] Filed: Sept. 6, 1973

[21] Appl. No.: 394,651

[30] Foreign Application Priority Data
Sept. 11, 1972 Japan .............................. 47-91091

[52] U.S. Cl. ................................. 354/109; 95/1.1
[51] Int. Cl. ........................................ G03b 17/24
[58] Field of Search ...................... 95/1.1; 354/109

[56] References Cited
UNITED STATES PATENTS

| | | | |
|---|---|---|---|
| 2,821,124 | 1/1958 | Enright | 95/1.1 |
| 2,987,976 | 6/1961 | Martin | 95/1.1 |
| 3,424,527 | 1/1969 | Bremson | 95/1.1 X |
| 3,452,196 | 6/1969 | Gray | 95/1.1 X |

Primary Examiner—John M. Horan
Attorney, Agent, or Firm—Flynn & Frishauf

[57] ABSTRACT

In a camera incorporating an electronic shutter, a common power source is used both for a light source for illuminating the data to be recorded and an electronic shutter control circuit. In response to the electrical signal representing the closure of a shutter, a data recording circuit is energized so that the data may be recorded through optical means on a part of a film.

2 Claims, 3 Drawing Figures

PATENTED JUN 10 1975　　　　　　　　　　　　3,889,281

CAMERA INCORPORATING DATA RECORDING DEVICE

BACKGROUND OF THE INVENTION

1. Field of the Invention

The present invention relates to a data recording device incorporated in an electronic shutter camera.

2. Description of the Prior Art

There has been known in the art a data recording device incorporated in a camera comprising a data carrier for indicating the data or the conditions under which a photo is taken, an illumination light source and a power source. The desired data are recorded through optical means a part of a film. A shutter release button is interlocked with a switch of a circuit for turning on illumination means such as a lamp, a light-emitting diode or the like so that when the shutter release button is depressed the circuit is energized. A power source for an electronic shutter control circuit is generally a silver or mercury battery which is compact in size yet with a relatively large capacity becuase the space for the power source available in a camera body is limited. It is not preferable to draw a large current from such a battery so that it is not advantageous to turn on a light source for illuminating the data to be recorded while the electronic control circuit is still energized.

In a camera of the type wherein the data are recorded prior to the opening of the shutter, record reliability tends to be lost, since an actuation of the shutter may be delayed. It is therefore desired that the data are recorded only after the shutter has been opened and closed. However, in the conventional system in which a switch of a data illumination light source is so interlocked with a shutter release button so that when the latter is depressed the former is closed, the adjustment of timing when the illumination light source is turned on after the shutter has been closed is very difficult. Furthermore when the shutter button is released immediately after the shutter has been opened, the illumination light source is not not turned on or a sufficient illumination time is obtained so that the desired data cannot be recorded. Poor contact of the contacts and chattering occurs in a mechanical switch so that the positive and reliable operation of a data recording device cannot be ensured.

SUMMARY OF THE INVENTION

In view of the above one of the objects of the present invention is to provide a data recording device which may be energized by current supplied from a common power source with an electronic shutter control circuit and which ensures the reliable data recording.

The above object is accomplished by the present invention which provides such an arrangement that an illumination circuit of the data recording device is energized in response to the electrical signal from the electronic shutter control circuit representing the closure of a shutter. Furthermore there is provided a circuit adapted to keep the illumination circuit energized once a shutter release button is depressed until the data is recorded.

BRIEF DESCRIPTION OF THE INVENTION

The above and other objects, features and advantages of the present invention will become more apparent from the following description of some preferred embodiments thereof taken in conjunction with the accompanying drawing in which.

DESCRIPTION OF THE PREFERRED EMBODIMENTS

Figure 1:
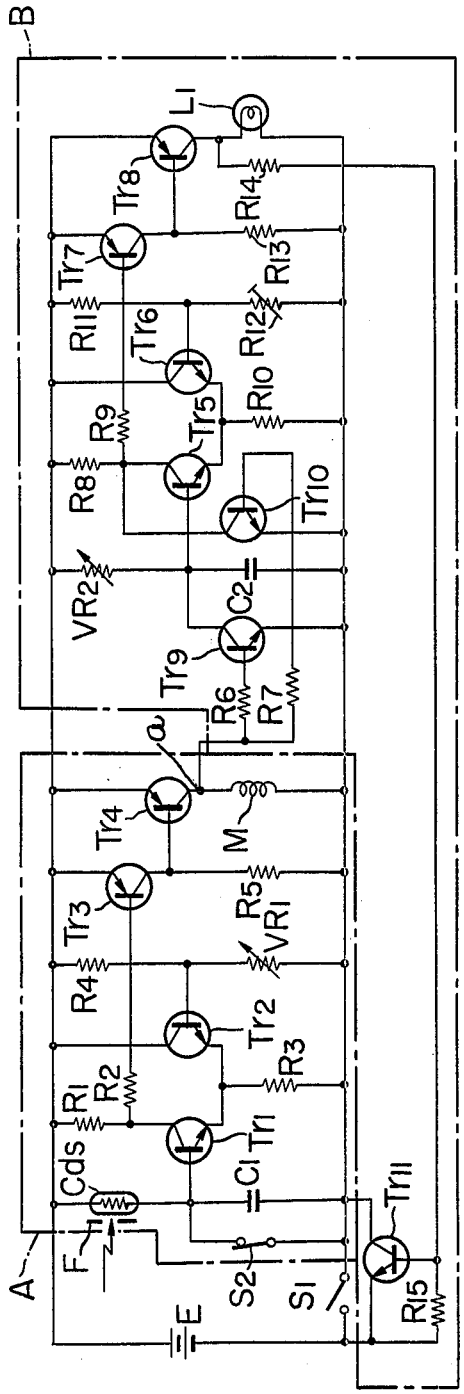
FIG. 1 is a circuit diagram of a first embodiment of the present invention illustrating a data recording device incorporated in an electronic shutter control circuit.

First referring to FIG. 1 illustrating a first embodiment of the present invention, an electronic shutter control circuit generally indicated by A is of the conventional type comprising a time constant circuit comprising a photocell CdS and a capacitor C1, a differential amplifier comprising transistors Tr1–Tr4 and resistors R1–R5, an electromagnet M for controlling a shutter closure member, a variable resistor VR1 for setting aperture information, and an aperture F provided in the front of the photocell for setting a film sensitivity information.

A data recording circuit generally indicated by B of the present invention incorporated in the electronic shutter control circuit A comprises a time constant circuit consisting of variable resistor VR2 and a capacitor C2 for setting a film speed information, transistors TR5–Tr11, resistors R6–R15, and a light source L1 for illuminating the data to be recorded upon a film. The electronic shutter control circuit A and the data recording circuit B further include an on-off switch S1 interconnected to a shutter release button (not shown), a count-start switch S2 for short-circuiting the capacitor C1, and a power source E.

Next the mode of operation will be described. Upon depression of the shutter release button (not shown) the on-off switch S1 is closed so that a current path is completed for the shutter control circuit A and the data recording circuit B, thus the electromagnet M for controlling the shutter closure member is energized so as to hold the shutter closure member. When the shutter release button is further depressed, the shutter is opened for exposure, and incorporating with this operation the count start switch S2 is opened so that the capacitor C1 initiates to be charged. Until the charging voltage of the capacitor C1 reaches a predetermined value, the transistors $Tr_1$ and $Tr_3$ retain the cut off condition, and thus the transistor $Tr_4$ conducts now. At this time, a voltage at the terminal of transistor $Tr_4$ is substantially equal to the voltage of the source E, and the energized electromagnet M holds the shutter closure member.

When the charging voltage of the capacitor C1 reaches up the predetermined value, the transistor $Tr_1$ of the differential amplifier is turned on, and then the switching transistor $Tr_3$ is also turned on, thus the transistor $Tr_4$ is turned off. Therefore, the voltage at the terminal $a$ of the transistor $Tr_4$ goes down to 0 volt, and the electromagnet M is deenergized so as to release the shutter closure member thereby closing the shutter. In addition to the fact that the thus dropped voltage at the terminal $a$ functions as a closure signal which causes the electromagnet M to be deenergized, such dropped voltage is applied to the bases of the switching transistors $Tr_9$ and $Tr_{10}$ of the data recording circuit B so as to turn them off. As a result, the transistor $Tr_8$ is turned on so as to supply a current to the lamp $L_1$. The lamp $L_1$ is illuminated during the time determined by the time constant $C_2$, whereby the data recorded on the carrier is illuminated so that said data is recorded through photo system on the film to be recorded.

Even when the shutter release button is released after an operator hears the sound indicating the completion of the exposure so that the on-off switch S1 is opened, the transistor Tr11 is kept conducting as long as the transistor Tr8 is conducting so that the data recording circuit may be kept energized. After a time interval required for recording the data the transistor Tr8 is cut off so that the transistor Tr11 is also cut off. Thus the data recording operation is accomplished.

Figure 2:
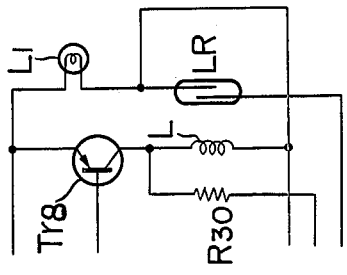
FIG. 2 is a circuit diagram of a variation thereof.

Next referring to FIG. 2 a variation of the first embodiment described hereinbefore with reference to FIG. 1 will be described. Instead of the transistor Tr8 of the first embodiment a reed relay LR may be used. That is, the control coil of the reed relay LR is inserted into the collector circuit of the transistor Tr7 and the illumination lamp L1 is connected in series to the control coil.

Figure 3:
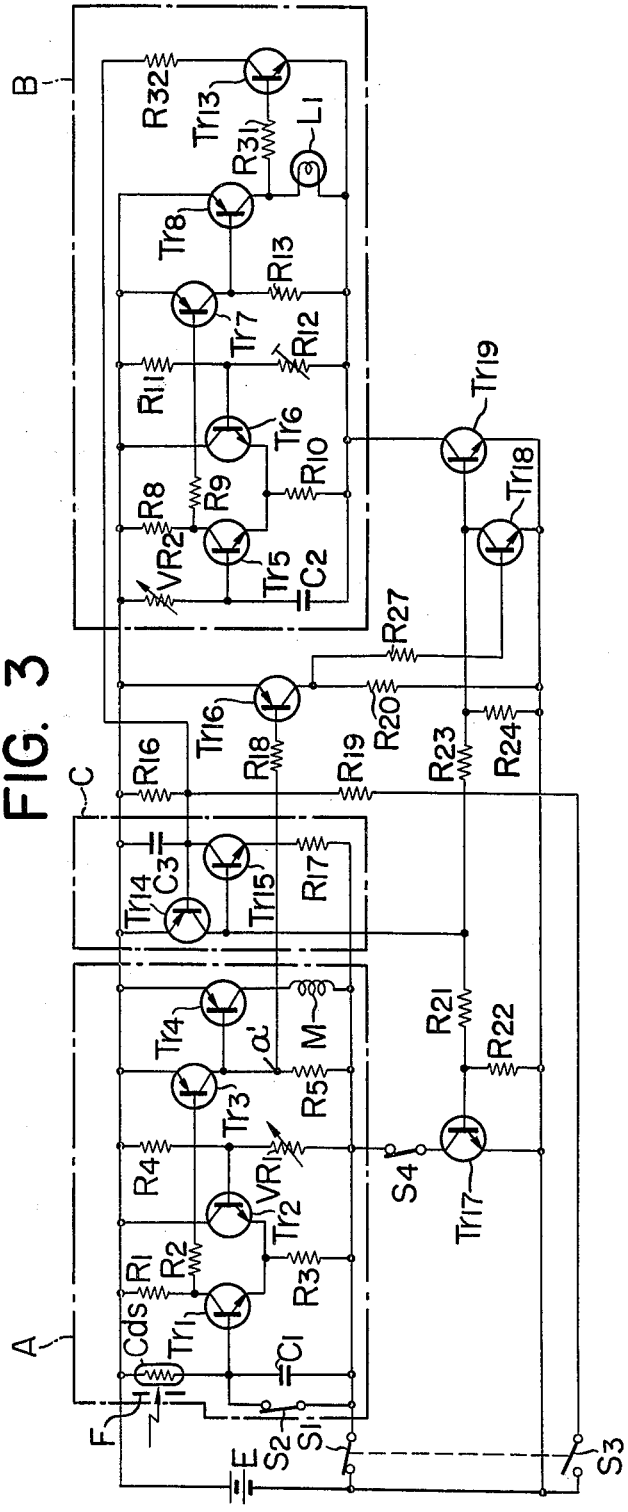
FIG. 3 is a second embodiment of a data recording device of the present invention.

Whereas the shutter release button of the first embodiment must be kept depressed until the exposure is completed, this problem is overcome by the second embodiment of the present invention to be described hereinafter with reference to FIG. 3. In FIG. 3 there is shown a data recording circuit including a power source holding circuit. A memory circuit is generally indicated by C and shown as comprising transistors Tr14 and Tr15 and a resistor R17. When a switch S3 is closed a voltage divided by resistors R16 and R19 is applied to the base of the transistor Tr14 so that the closing of the switch S3 is stored or memorized. Transistors Tr17 and Tr19 function in a manner substantially similar to that of the transistor Tr11 and the functions of resistors R21 and R23 and of resistors R22 and R24 are similar to those of the resistors R14 and R15 of the first embodiment, respectively. A transistor Tr18 serves to interrupt the supply of the power to the data recording circuit B when the electronic shutter control circuit A is energized, and is cut off in response to the signal representing the completion of the exposure so that the power is supplied to the data recording circuit B through the transistor Tr19. The signal representing the completion of exposure is transmitted through a transistor Tr16. A capacitor C3 is inserted in order to prevent the erratic operation, and a transistor Tr13 gives the memory circuit C the signal representing that the data is being recorded. The switch S3 is adapted to be closed when the shutter release button is fully depressed, and a switch S4 is closed when shutter is closed but is opened when the film is advanced.

Next the mode of operation will be described. Upon depression of the shutter release button, the on-off switch S1 is closed. The count-start switch S2 is closed so that the transistors Tr1 and Tr3 are cut off whereas the transistor Tr4 is conducted. As a result the electromagnet M is energized.

Since the memory circuit is de-energized the transistor Tr9 is cut off so that the data recording circuit is not energized. When the shutter release button is further depressed the shutter opening member is actuated for exposure and the switch S3 is closed so that the memory circuit C memorizes that the shutter has been started. The current flows through the resistor 23 into the base of the transistor Tr19, but the transistor Tr19 is not conducted because the transistor Tr18 is supplied with current through the resistor R27 from the transistor Tr16 and is therefore conducted. As a result the data recording circuit B has not been energized yet.

After an optimum exposure time has been elapsed, the transistors Tr1 and Tr3 of the shutter control circuit A are conducted whereas the transistor Tr4 is cut off so that the electromagnet M is de-energized. As a result the shutter closure member is released to close the shutter. When the shutter is closed the switch S4 is opened and the transistor Tr3 is conducted, the voltage at the terminal $a'$ is raised and that raised voltage signal is applied through the resistor 18 to the base of the transistor $Tr_{16}$, so that the transistors Tr16 and Tr18 are cut off. As a result the transistor Tr19 is conducted so that the data recording circuit B is energized. As a result the illumination lamp L1 is turned on.

When the data recording circuit B is energized, the signal representing that the data recording circuit B is energized is transmitted from the transistor Tr13 to the transistor Tr14 so that the switch S4 is opened. As a result even if the memory circuit C is de-energized, current flows into the transistor Tr19 through the transistor Tr14 and the resistor R23 so that the data recording circuit B is kept energized.

After an illumination time which corresponds to a film speed, the transistor Tr18 is cut off so that the illumination lamp L1 is turned off and the transistors Tr13 and Tr14 are cut off. As a result the transistor Tr19 is cut off whereby the data recording circuit B is de-energized.

As described hereinbefore, according to the present invention the signal representing the energization of the data recording device is received in a non-contact manner from the shutter control circuit after the optimum exposure. Therefore, the accidents due to the malfunction of the mechanical switch such as the poor contact between chattering contacts and the damage to the contacts may be eliminated. Since the data recording circuit is kept energized until data recording is completed once the shutter release button is depressed, the data recording operation is accomplished even when the shutter release button is released while the shutter is actuated. Risk of failure of data recording, of interruption of data recording before the data has been completely recorded and of poor recording of data may thus be practically eliminated. It is no longer necessary to keep the shutter release button depressed for the recording function and the operation of a camera may hence be much simplified.

What is claimed is:

1. A camera incorporating a data recording device, comprising:
   a power source on-off switch adapted to be opened and closed in response to the depression of a shutter release button;
   a shutter control circuit including a first time constant circuit comprising a photoelectric element and a capacitor, a switching circuit, an electromagnet for controlling a shutter closure member, and a circuit for activating said electromagnet;
   a data carrier;
   an optical system;
   a data recording circuit including a light source for exposing data recorded on said carrier, a second time constant circuit for controlling an illumination time duration of said light source, and a switching circuit for intermittently illuminating said light source; and a power source battery connected to both said shutter control and data recording circuits;

wherein an output terminal of said electromagnet activating circuit in said shutter control circuit is connected to said switching circuit in said data recording circuit, and upon the depression of the shutter release button, said electromagnet is energized to hold the shutter closure member during a time determined by said first time constant circuit, and thereafter upon the deenergization of said electromagnet, said shutter closure member is released thereby completing shutter operation and a signal is applied from the output terminal of said electromagnet activating circuit to said switching circuit of said data recording circuit, in response to which signal said light source is illuminated for a duration determined by said second time constant circuit whereby the data is recorded on a film to be recorded.

2. A camera as defined in claim 1 further comprising holding circuit means for keeping said data recording circuit energized until the data is completely recorded even after said power source on-off switch is opened.

* * * * *